(12) United States Patent
Chen et al.

(10) Patent No.: US 8,646,698 B2
(45) Date of Patent: Feb. 11, 2014

(54) PROTECTIVE COVER OF MOBILE ELECTRONIC PRODUCT

(75) Inventors: Shih-Hui Chen, Taoyuan Hsieh (TW); Chin-Tien Lin, Taoyuan Hsieh (TW); Hua-Chi Cheng, Taoyuan Hsieh (TW)

(73) Assignee: Tennrich International Corp., Taoyuan Hsieh (TW)

( * ) Notice: Subject to any disclaimer, the term of this patent is extended or adjusted under 35 U.S.C. 154(b) by 150 days.

(21) Appl. No.: 13/396,881

(22) Filed: Feb. 15, 2012

(65) Prior Publication Data

US 2013/0206844 A1 Aug. 15, 2013

(51) Int. Cl.
*G06K 19/06* (2006.01)
*G06K 19/00* (2006.01)
*G06K 7/08* (2006.01)
*G06K 7/00* (2006.01)
*G08B 13/14* (2006.01)
*H04M 1/00* (2006.01)

(52) U.S. Cl.
USPC ........... 235/492; 235/435; 235/487; 235/451; 455/575.8; 455/575.1; 455/556.1; 340/572.1

(58) Field of Classification Search
USPC ......... 455/575.1, 575.8, 572, 556.1; 235/487, 235/492, 451, 435; 340/572.1
See application file for complete search history.

(56) References Cited

U.S. PATENT DOCUMENTS

| | | | |
|---|---|---|---|
| 6,078,792 A * | 6/2000 | Phillips | 455/575.1 |
| 6,820,813 B2 * | 11/2004 | Salvato et al. | 235/472.02 |
| 7,194,291 B2 * | 3/2007 | Peng | 455/575.8 |
| 7,230,823 B2 * | 6/2007 | Richardson et al. | 361/679.25 |
| 7,248,892 B2 * | 7/2007 | White et al. | 455/550.1 |
| 7,400,917 B2 * | 7/2008 | Wood et al. | 455/575.8 |
| 7,929,278 B2 * | 4/2011 | Watanabe et al. | 361/679.01 |
| 8,428,644 B1 * | 4/2013 | Harooni | 455/550.1 |
| 8,483,758 B2 * | 7/2013 | Huang | 455/557 |
| 8,579,172 B2 * | 11/2013 | Monaco et al. | 224/666 |
| 2002/0009976 A1 * | 1/2002 | Rashidi | 455/90 |
| 2002/0072387 A1 * | 6/2002 | Kao | 455/550 |
| 2002/0196127 A1 * | 12/2002 | Benson | 340/10.4 |
| 2002/0197965 A1 * | 12/2002 | Peng | 455/90 |
| 2003/0013483 A1 * | 1/2003 | Ausems et al. | 455/556 |
| 2003/0096642 A1 * | 5/2003 | Bessa et al. | 455/573 |
| 2003/0116631 A1 * | 6/2003 | Salvato et al. | 235/472.01 |
| 2004/0014506 A1 * | 1/2004 | Kemppinen | 455/575.1 |
| 2004/0203486 A1 * | 10/2004 | Shepherd et al. | 455/90.1 |
| 2005/0009579 A1 * | 1/2005 | Chen et al. | 455/575.1 |
| 2005/0079820 A1 * | 4/2005 | Yamashita | 455/41.2 |
| 2005/0101350 A1 * | 5/2005 | Wang | 455/558 |
| 2006/0003709 A1 * | 1/2006 | Wood | 455/90.3 |
| 2006/0086786 A1 * | 4/2006 | Spencer | 235/380 |
| 2006/0111052 A1 * | 5/2006 | Gartrell | 455/90.3 |
| 2006/0111053 A1 * | 5/2006 | Wu et al. | 455/90.3 |
| 2007/0155430 A1 * | 7/2007 | Cheon et al. | 455/558 |
| 2008/0070003 A1 * | 3/2008 | Nakatani et al. | 428/141 |
| 2008/0132289 A1 * | 6/2008 | Wood et al. | 455/566 |
| 2009/0128339 A1 * | 5/2009 | Mitchell et al. | 340/572.8 |

(Continued)

*Primary Examiner* — Daniel Walsh
(74) *Attorney, Agent, or Firm* — Jackson IPG PLLC

(57) ABSTRACT

A protective cover of a mobile electronic product capable of adding a backup battery to the exterior of the mobile electronic product, and the mobile electronic product is connected to the backup battery. In the protective cover of the mobile electronic product, a RFID module is installed for applying the mobile electronic product in a non-contact access identification device or a secured transaction device. The backup battery can supply electric power to the mobile electronic product to overcome the difficulty of accessing backup power.

18 Claims, 5 Drawing Sheets

(56) References Cited

U.S. PATENT DOCUMENTS

| | | | |
|---|---|---|---|
| 2009/0243791 A1* | 10/2009 | Partin et al. | 340/5.2 |
| 2009/0275308 A1* | 11/2009 | Valdez et al. | 455/405 |
| 2010/0078343 A1* | 4/2010 | Hoellwarth et al. | 206/320 |
| 2010/0093412 A1* | 4/2010 | Serra et al. | 455/575.8 |
| 2010/0182144 A1* | 7/2010 | Yamashita et al. | 340/539.11 |
| 2010/0210300 A1* | 8/2010 | Rizzo et al. | 455/552.1 |
| 2012/0074006 A1* | 3/2012 | Monaco et al. | 206/320 |
| 2012/0122520 A1* | 5/2012 | Phillips | 455/556.2 |
| 2012/0168516 A1* | 7/2012 | Bolger et al. | 235/492 |
| 2012/0244848 A1* | 9/2012 | Ghaffari et al. | 455/415 |
| 2013/0017788 A1* | 1/2013 | Norair et al. | 455/41.2 |
| 2013/0109309 A1* | 5/2013 | Desclos et al. | 455/41.1 |
| 2013/0109435 A1* | 5/2013 | McCaughey et al. | 455/556.1 |
| 2013/0130757 A1* | 5/2013 | Luo et al. | 455/575.7 |
| 2013/0146661 A1* | 6/2013 | Melbrod et al. | 235/435 |
| 2013/0244724 A1* | 9/2013 | Monti et al. | 455/556.1 |
| 2013/0273944 A1* | 10/2013 | Wilson et al. | 455/457 |
| 2013/0316690 A1* | 11/2013 | Wildner et al. | 455/418 |

* cited by examiner

PROTECTIVE COVER OF MOBILE ELECTRONIC PRODUCT

BACKGROUND OF THE INVENTION

1. Field of the Invention

The present invention relates to receiving and accommodating accessories of a mobile electronic product, and more particularly to a protective cover of a mobile electronic product having a backup battery installed outside the mobile electronic product and connected to the mobile electronic product, as well as providing an identification function.

2. Description of Related Art

Chip cards are divided according to their communication interface into three major types, respectively: contact cards, non-contact cards, and dual-interface (Combi/Hybrid) card.

For contact cards, it is necessary to insert the contact card into a card reader to access and process data for the use of the contact card, and the speed is relatively slow, but both security and accuracy are high, so that the contact cards are applicable in financial cards and credit cards. At present, national health insurance IC cards, ID smart cards, chip financial cards, and electronic wallets such as i-Cash and Mondex are contact cards.

For non-contact cards, a near field communication (NFC) technology is generally adopted, and the NFC technology is a wireless communication technology for short-distance applications, and a frequency band of 13.56 MHz is used and the RFID technology is applied to transmit data by low power within a short distance, and users simply need to place the card within the sensing range of a card reading terminal device to access data of the card, so that the non-contact cards have the advantages of a fast reading speed and a convenient use and they are applicable for security control and public transportation system such as EasyCard used for mass rapid transit and buses as well as Octopus card used in Hong Kong.

Some of the present mobile phones come with the NFC function and can provide the convenient e-Commerce services such as the electronic wallets and the EasyCard, and users just need to carry such mobile phone to do shopping or use a public transportation system without the need of carrying a wallet. One of the most famous applications is the NTT DoCoMo i-mode mobile wallet, wherein a Sony Felicanon-contact IC is soldered into the main board of a NTT 3G mobile phone to implement the aforementioned function. Another method includes the use of Philips NFC IC and antenna. Since it is necessary to purchase a new telephone in order to use the mobile wallet function, therefore this method has the drawback of requiring an additional cost.

SUMMARY OF THE INVENTION

Therefore, it is a primary objective of the present invention to overcome the aforementioned problems by providing a protective cover of a mobile electronic product that can bundle a backup battery to the exterior of the mobile electronic product and the mobile electronic product is connected to the backup battery, and provide the identification function concurrently.

To achieve the aforementioned objectives, the present invention provides a protective cover of a mobile electronic product, the protective cover comprises a casing for fixing a battery and a RFID module, a covering portion matched with a system of the mobile electronic product, and a power output port coupled to a power slot of the mobile electronic product, wherein the covering portion is disposed around the periphery of the casing; the power output port is disposed at an edge of another covering portion and electrically coupled to the battery inside the casing, and a shielding element is installed between the battery and the RFID module.

Therefore, the protective cover of the mobile electronic product of the present invention together with the battery and RFID module in the casing can be attached onto the exterior of the mobile electronic product, and the power output port is used for electrically coupling the mobile electronic product with the battery to achieve the effect of providing a backup power to the mobile electronic product. In the meantime, the RFID module can be used to facilitate the applications of the mobile electronic product in non-contact access identification devices or secured transaction devices.

Specifically, the protective cover of the mobile electronic product of the present invention can be attached onto the exterior of the mobile electronic product to protect the mobile electronic product to a certain extent or beautify the product, and the battery and the RFID module can be attached onto the exterior of the mobile electronic product, wherein the battery can be electrically connected to the mobile electronic product to supply backup power to the mobile electronic product and overcome the difficulty of carrying the backup battery.

In the meantime, the mobile electronic product can integrate the RFID module with the near field communication function to facilitate applications in non-contact access identification devices or secured transaction devices.

The technical characteristics and effects of the present invention will become apparent with the detailed description of preferred embodiments accompanied with related drawings as follows.

DETAILED DESCRIPTION OF THE PREFERRED EMBODIMENTS

Figure 1:
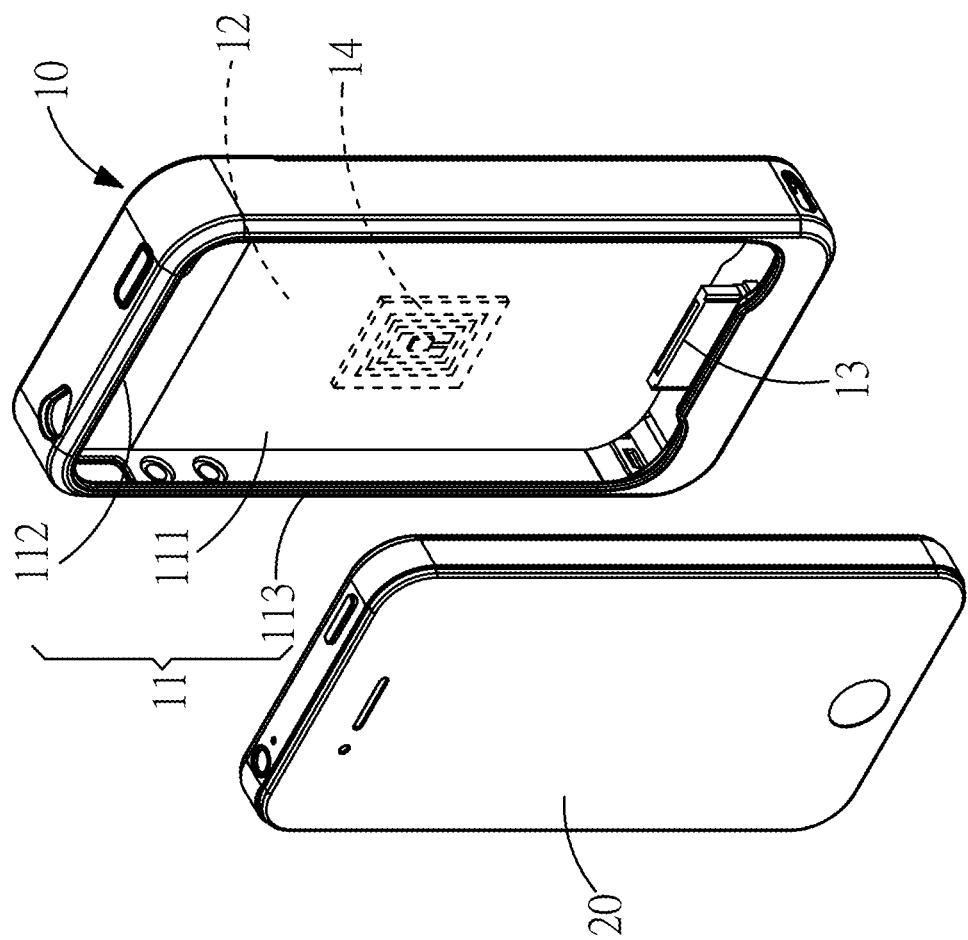
FIG. 1 is a schematic view of using a protective cover of a mobile electronic product in accordance with a preferred embodiment of the present invention.
Figure 2:
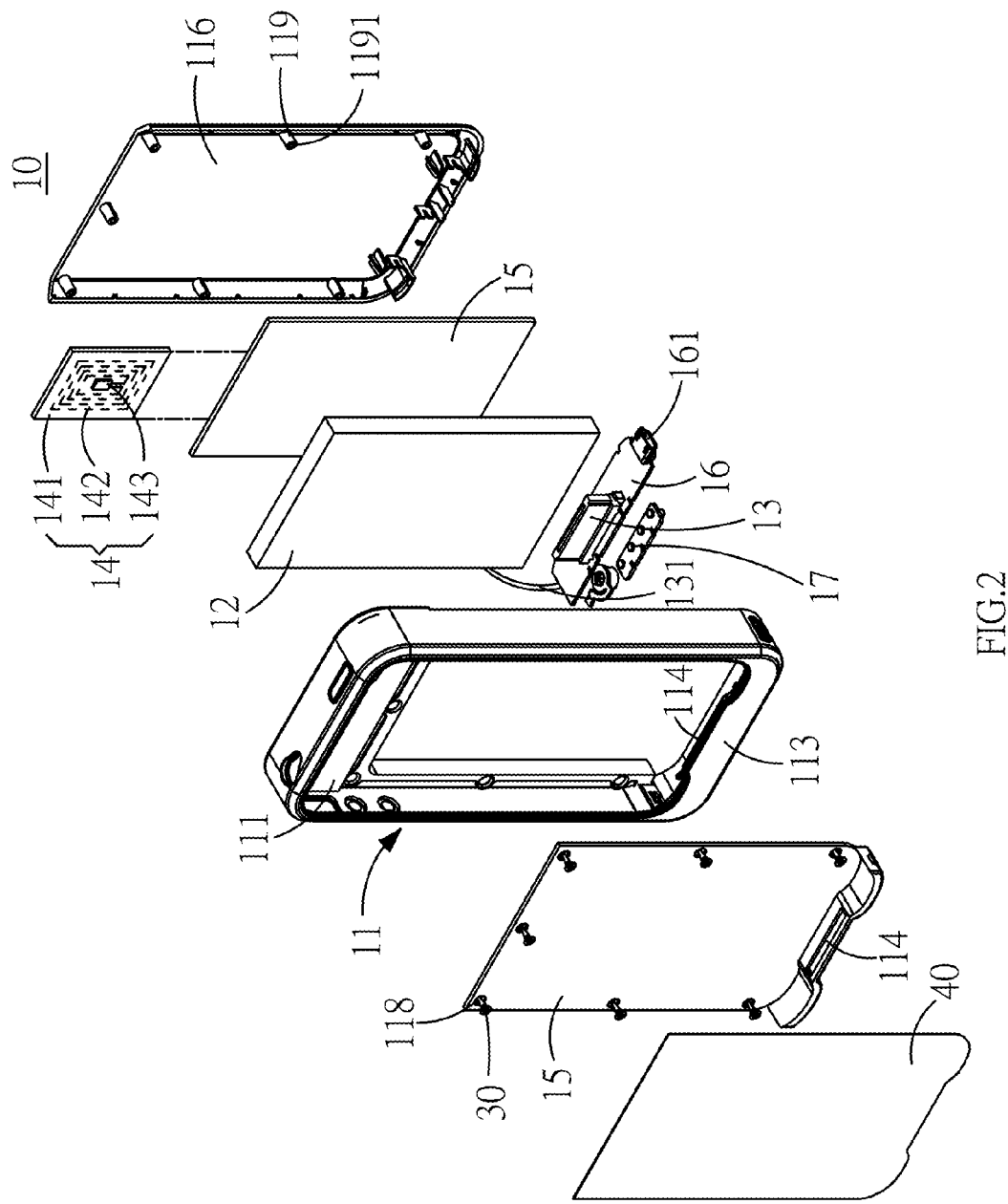
FIG. 2 is an exploded view of a protective cover of a mobile electronic product in accordance with a preferred embodiment of the present invention.

With reference to FIGS. 1 and 2 for the schematic view of using a protective cover of a mobile electronic product and the exploded view of the protective cover in accordance with a preferred embodiment of the present invention respectively, the protective cover 10 of the mobile electronic product comprises: a cover body 11, a battery 12, a power output port 13, a radio frequency identification (RFID) module 14 and a shielding element 15.

The cover body 11 includes a casing 111, an opening 112 formed on a front side of the casing 111 and provided for containing a mobile electronic product 20 (such as a mobile phone or a flat PC), and at least one covering portion 113 formed at the periphery of the casing 111, wherein the casing 111 is made of plastic or metal, and the covering portion 113 is made of a soft material, and the covering portion 113 is mainly provided for engaging with the system of the mobile electronic product 20 to combine the cover body 11 with the mobile electronic product 30, while protecting and beautifying the mobile electronic product 30 to a certain level. The cover body 11 includes a front cover 115 and a rear cover 116 that cover openings formed on the front and back of the casing 111 respectively to achieve the effect of fixing the battery 12.

The battery 12 is installed in the casing 111 of the cover body, and the power output port 13 is formed at the position of the covering portion 113 and electrically coupled to the battery 12 inside the casing 111 for connecting the mobile electronic product 20 to achieve the effect of transmitting the power of the battery 12 to the mobile electronic product 20. Of course, the protective cover 10 of the mobile electronic product of the present invention may or may not include a built-in battery depending on user requirements. In other words, users can purchase and install an appropriate battery into the casing or decide whether or not to install the battery.

Figure 3:
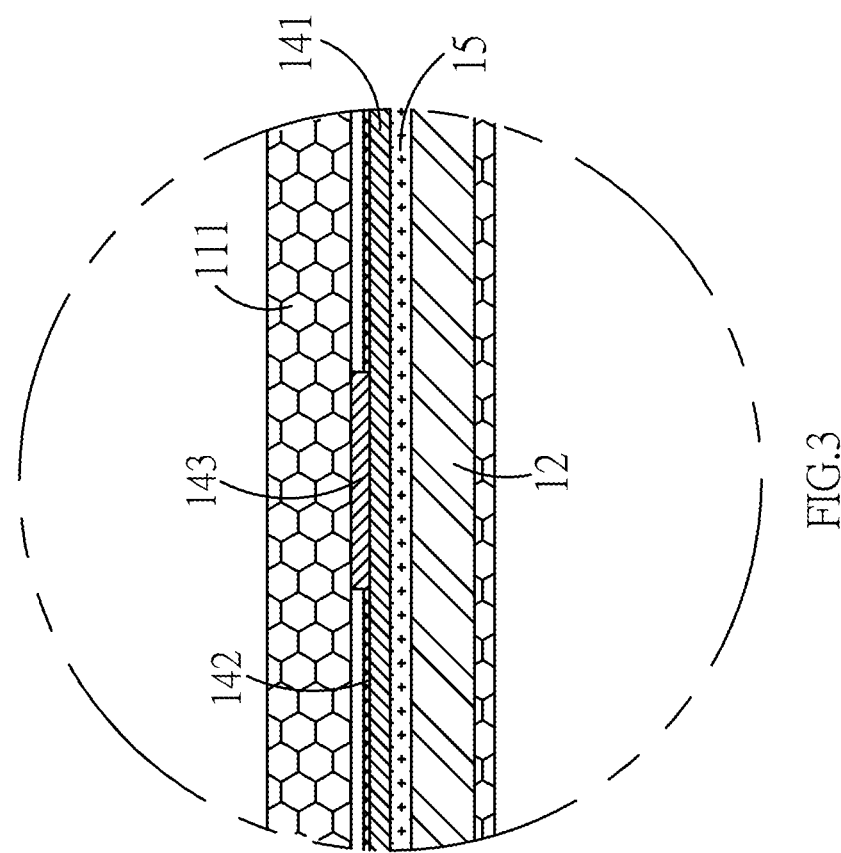
FIG. 3 is a schematic view of a protective cover of a mobile electronic product in accordance with a preferred embodiment of the present invention.

The RFID module 14 is installed in the casing 111 of the cover body as shown in FIG. 3, and the RFID module 14 includes a carrier 141, and the carrier 141 includes an antenna 142 and a chip 143 coupled to the antenna 142, and the carrier 141 can be a flexible circuit board.

The shielding element 15 (which can be a wave absorbing structure or a waveguide structure) is installed in the casing 111 of the cover body and disposed between the carrier 141 and the battery 12, and the shielding element 15 is provided for separating the battery or the mobile electronic product from electromagnetic waves to avoid the electromagnetic interference of the electromagnetic wave from affecting the correctness of data read from the chip 143.

When the protective cover 10 of the mobile electronic product of the present invention is used, the protective cover 10 is worn and attached onto the exterior of the mobile electronic product 20 to achieve the expected effects of protecting and beautifying the mobile electronic product 20. Particularly, if the casing 111 of the protective cover 10 of the mobile electronic product of the present invention has a battery 12 installed, the battery 12 in the casing 111 is attached to the exterior of the mobile electronic product 20, and the power output port 13 is provided for electrically coupling the mobile electronic product 20 with the battery 12 to provide backup power to the mobile electronic product 20.

In addition, the RFID module 14 in the cover body is bundled with the mobile electronic product 20 for a convenient application, wherein the RFID module 14 further includes an identification function and can be applied in a credit card for a non-contact access identification or a secured transaction system, or EasyCard used for mass rapid transit and bus or any other stored value cards.

The technical characteristics and related components of the protective cover 10 of the mobile electronic product of the present invention are further described below.

The protective cover 10 of the mobile electronic product of the present invention further comprises a circuit board 16 installed in the casing 111 and electrically coupled to the battery 12, and the power output port 13 is disposed on the circuit board 16, and the circuit board 16 is installed at the casing 111 of the cover body and provided for coupling a power slot of the mobile electronic product 20 to connect the circuit board 16 to the battery 12 in order to achieve the effect of transmitting electric power of the battery 12 to the mobile electronic product 20.

The cover body 11 includes a front cover 115 and a rear cover 116 that covers openings formed at the front and back of the casing 111 respectively, and the casing 111 further includes a plurality of positioning holes 117, and the front cover 115 includes a plurality of screw through holes 118 corresponding to the plurality of positioning hole 117 respectively, and the rear cover 116 includes a plurality of short pillars 119 inserted into the plurality of positioning holes 117 respectively, and each short pillar 119 has a screw hole 1191 formed thereon.

The plurality of screws 30 is sequentially passed through the screw through holes 118 of the front cover 115 and then secured into the screw holes 1191 of the rear cover 116 to assure the front cover 115, the rear cover 116 and the casing 111 to be secured and combined with each other. After the front cover 115, the rear cover 116 and the casing 111 are secured and combined, a patch 40 is attached at a position of the front cover 115 to cover the screw 30 to enhance the aesthetic appearance.

In the present invention, the cover body 11 comprises a front cover 115 and a rear cover 116 that cover openings formed at the front and back of the casing 111 respectively, and the circuit board 16 can be installed at the opening formed at the bottom of the casing 111; and the front cover 115 includes a positioning slot 114 formed at the bottom for fixing the power output port 13 to assure that the power output port 13 is coupled to a corresponding power slot of the mobile electronic product 30.

The circuit board 16 further includes a power input port 161, such that the power input port 161 can be connected to a charger to charge the internal battery 12 directly.

Figure 4:
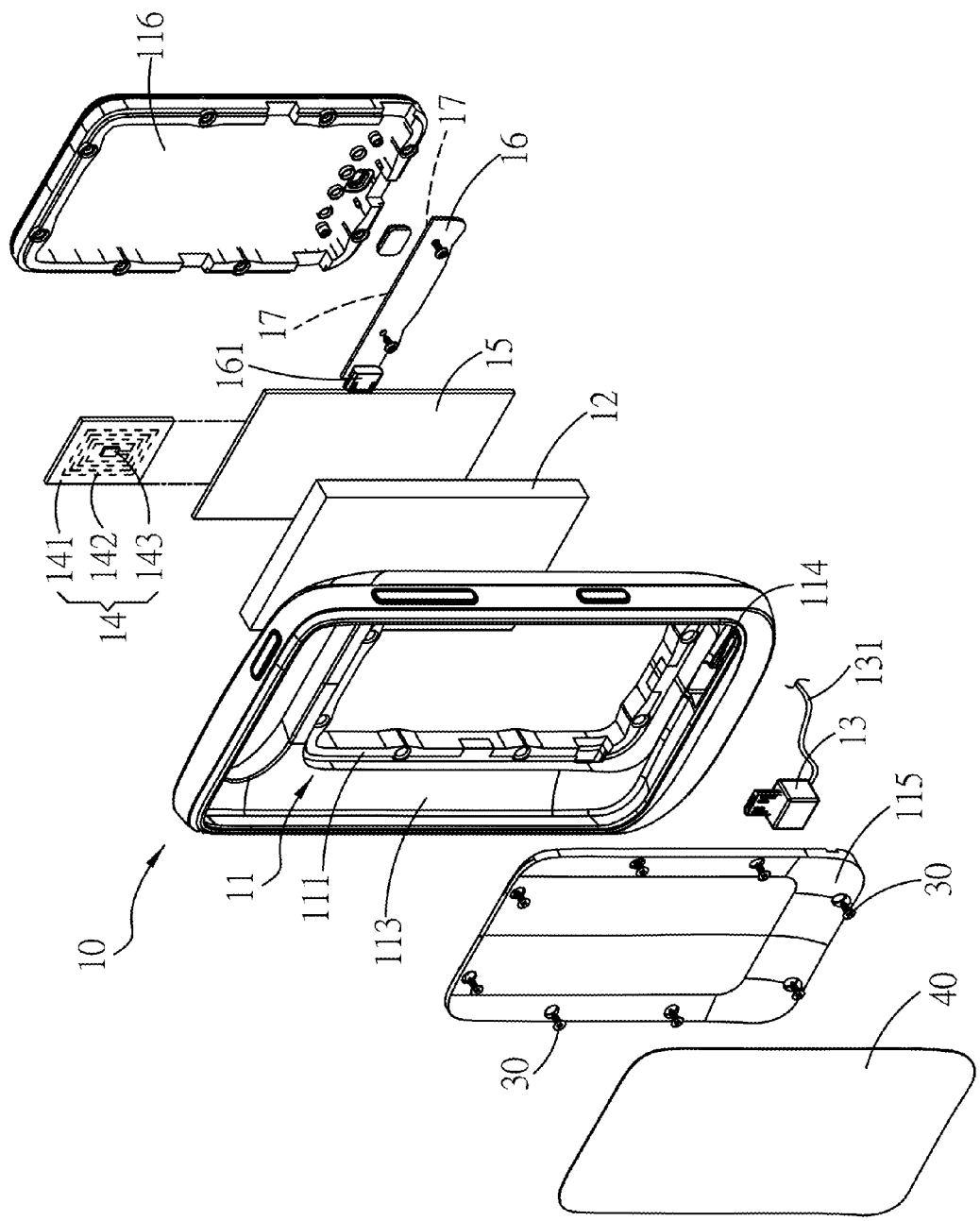
FIG. 4 is an exploded view of a protective cover of a mobile electronic product in accordance with another preferred embodiment of the present invention.
Figure 5:
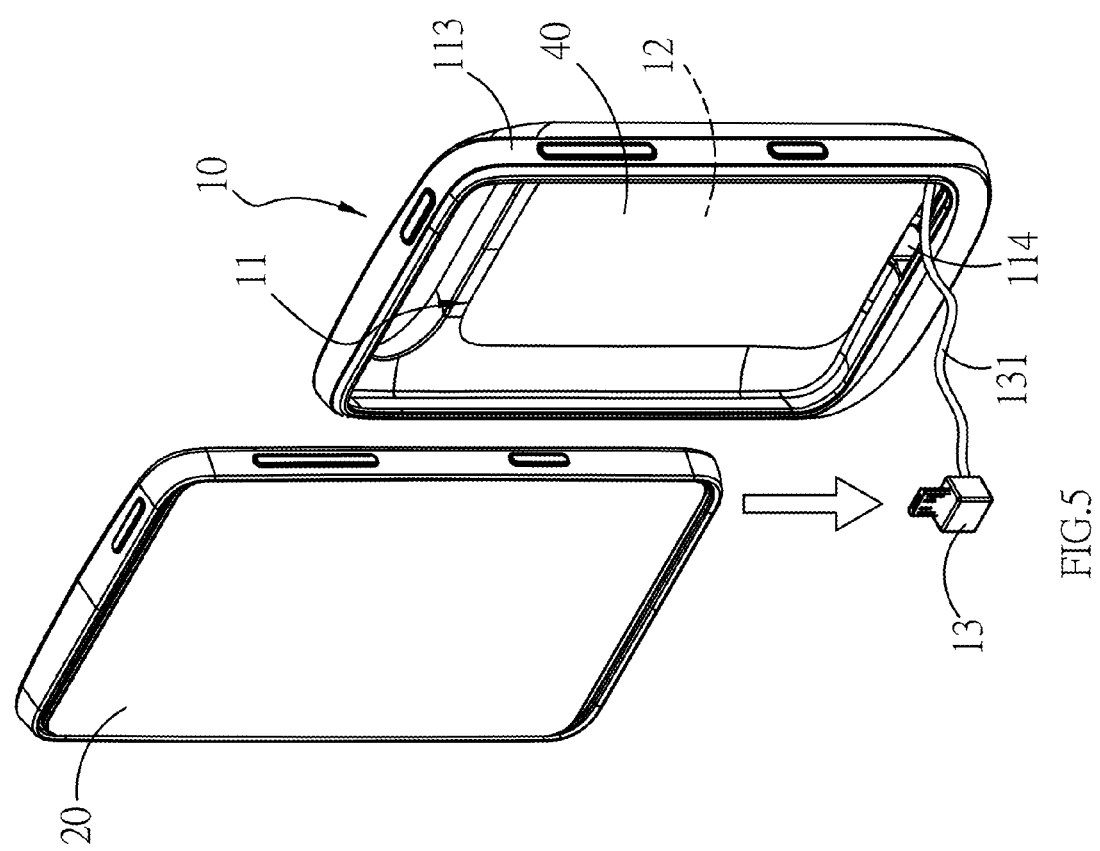
FIG. 5 is a schematic view of installing a protective cover of a mobile electronic product of the present invention.

With reference to FIGS. 4 and 5 for another preferred embodiment of the present invention, the cover body 11 includes a front cover 115 and a rear cover 116 that cover openings formed at the front and back of the casing 111 respectively, the casing 111 can use a plurality of screws 30 to pass through the front cover 115 and the casing 111 sequentially and be secured into the rear cover 116 to assure the front cover 115, the rear cover 116 and the casing 111 to be secured and combined with one another. After the front cover 115, the rear cover 116 and the casing 111 are secured and combined with one another, a patch 40 is stuck at a position of the front cover 115 to cover the screws 30 to enhance the aesthetic appearance.

The power output port 13 is electrically coupled to the circuit board 16 through a power cable 131, and the covering portion 113 has a positioning slot 114 formed therein for fixing the power output port 13 to facilitate users to connect the power output port 13 to a power slot of the mobile electronic product 30.

In the protective cover 10 of the mobile electronic product of the present invention as shown in FIG. 2, the casing 111 includes a circuit board 16 installed therein and electrically coupled to the battery 12, and the circuit board 16 further includes a power input port 161, so that the power input port 161 can be connected to an electric charger for charging the battery 12 in the casing 111 directly.

In each of the foregoing preferred embodiments, the circuit board 16 further includes at least one optoelectronic component 17 installed at the bottom of the front cover 115, and the at least one optoelectronic component 17 is provided for displaying a power level of the battery 12 installed inside the cover body 11 or further displaying the related operation status.

Compared with the prior art, the protective cover of the mobile electronic product of the present invention can be attached onto the exterior of the mobile electronic product to protect the mobile electronic product to a certain extent or beautify the product, and the battery and the RFID module can be attached onto the exterior of the mobile electronic product, wherein the battery can be electrically connected to the mobile electronic product to supply backup power to the mobile electronic product and overcome the difficulty of carrying the backup battery. In the meantime, the mobile electronic product integrates the RFID module with the near field communication function to facilitate applications in non-contact access identification devices or secured transaction devices.

In summation of the description above, the present invention overcomes the problems of the prior art and complies with patent application requirements, and is thus duly filed for patent application. While the invention has been described by means of specific embodiments, numerous modifications and variations could be made thereto by those skilled in the art without departing from the scope and spirit of the invention set forth in the claims.

What is claimed is:

1. A protective cover mobile of a electronic product, comprising:
    a cover body, having a casing, an opening formed at a front side of the casing and provided for containing the mobile electronic product, and at least one covering portion formed at the periphery of the casing;
    wherein the cover body includes a front cover and a rear cover that cover openings on both a front and a back of the casing respectively;
    a battery, installed in the casing of the cover body;
    a power output port, disposed at the covering portion, and electrically coupled to the battery in the casing;
    wherein the power output port is disposed on a circuit board disposed in the casing, the circuit board providing electric power from the battery to the mobile device through the power output port;
    a radio frequency identification (RFID) module, installed in the casing of the cover body, and having a carrier, and the carrier having an antenna and a chip coupled to the antenna; and
    a electromagnetic shielding element, installed in the casing of the cover body, and disposed between the carrier and the battery.

2. The protective cover of a mobile electronic product as recited in claim 1,
    wherein the casing is made of plastic or metal, and the covering portion is made of a soft material.

3. The protective cover of a mobile electronic product as recited in claim 1,
    wherein the circuit board includes a power input port formed thereon and coupled to the circuit board through the power input port to charge the battery inside the casing.

4. The protective cover of a mobile electronic product as recited in claim 1,
    wherein the casing includes a plurality of positioning holes, and the front cover includes a plurality of screw through holes corresponding to the plurality of positioning holes respectively, and
    the rear cover includes a plurality of short pillars inserted into the plurality of positioning holes respectively, and each short pillar includes a screw hole, such that a plurality of screws is passed through the screw through holes of the front cover and then screwed into the screw hole of the rear cover to assure the front cover, the rear cover and the casing to be secured and combined with one another.

5. The protective cover of a mobile electronic product as recited in claim 4,
    wherein the front cover includes a patch stuck at a position of the front cover to cover the screw.

6. The protective cover of a mobile electronic product as recited in claim 1,
    wherein the cover body includes the front cover and a rear cover that the cover openings on the front and the back of the casing respectively, and the circuit board is installed at an opening on a bottom of the casing.

7. The protective cover of a mobile electronic product as recited in claim 1,
    wherein the cover body includes the front cover and the rear cover that the cover openings on the front and the back of the casing respectively, and the cover body uses a plurality of screws to be passed through the front cover and the casing sequentially and then screw into the rear cover to assure the front cover, the rear cover and the casing to be secured and combined with one another.

8. The protective cover of a mobile electronic product as recited in claim 1,
    wherein the cover body includes a front cover and a rear that cover the openings on the front and the back of the casing respectively, and the circuit board is installed at an opening on a bottom of the casing.

9. The protective cover of a mobile electronic product as recited in claim 1,
    wherein the circuit board has a power input port formed thereon and coupled to the circuit board through the power input port to charge the battery inside the casing.

10. The protective cover of a mobile electronic product as recited in claim 1,
    wherein the circuit board includes at least one optoelectronic component installed thereon.

11. The protective cover of a mobile electronic product as recited in claim 1,
    wherein the shielding element is a wave absorbing structure.

12. The protective cover of a mobile electronic product as recited in claim 1,
    wherein the shielding element is a waveguide structure.

13. A protective cover mobile of a electronic product, comprising:
    a cover body, having a casing, an opening formed at a front side of the casing and provided for containing the mobile electronic product, and at least one covering portion formed at the periphery of the casing;
    wherein the cover body includes a front cover and a rear cover that cover openings on a front and a back of the casing respectively, and a circuit board disposed in the casing, the circuit board providing electric power from a battery to the mobile device through a power output port is installed at an opening on a bottom of the casing;
    the battery, installed in the casing of the cover body;
    the power output port, disposed at the covering portion, and electrically coupled to the battery in the casing;
    wherein the power output port is disposed on the circuit board;
    a radio frequency identification (RFID) module, installed in the casing of the cover body, and having a carrier, and the carrier having an antenna and a chip coupled to the antenna; and
    a electromagnetic shielding element, installed in the casing of the cover body, and disposed between the carrier and the battery.

14. The protective cover of a mobile electronic product as recited in claim 13,
    wherein the front cover includes a positioning slot formed at a bottom of the front cover for fixing the power output port.

15. A protective cover mobile of a electronic product, comprising:
- a cover body, having a casing, an opening formed at a front side of the casing and provided for containing the mobile electronic product, and at least one covering portion formed at the periphery of the casing;
- wherein the cover body includes a front cover and a rear cover that cover openings on the front and back of the casing respectively, and the cover body uses a plurality of screws to be passed through the front cover and the casing sequentially and then screw into the rear cover to assure the front cover, the rear cover and the casing to be secured and combined with one another;
- a battery, installed in the casing of the cover body;
- a power output port, disposed at the covering portion, and electrically coupled to the battery in the casing, wherein the power output port is coupled to the battery by a circuit board to provide electrical power to the mobile device;
- a radio frequency identification (RFID) module, installed in the casing of the cover body, and having a carrier, and the carrier having an antenna and a chip coupled to the antenna; and
- a electromagnetic shielding element, installed in the casing of the cover body, and disposed between the carrier and the battery.

16. The protective cover of a mobile electronic product as recited in claim 15,
- further comprising a patch stuck at a position of the front cover to cover the screw.

17. A protective cover mobile of a electronic product, comprising:
- a cover body, having a casing, an opening formed at a front side of the casing and provided for containing the mobile electronic product, and at least one covering portion formed at the periphery of the casing;
- wherein the cover body includes a front cover and a rear that cover openings on the front and back of the casing respectively, and a circuit board disposed at an opening in a bottom of the casing, the circuit board providing electric power from a battery to the mobile device through a power output port;
- the battery, installed in the casing of the cover body;
- the power output port, disposed at the covering portion, and electrically coupled to the battery in the casing;
- a radio frequency identification (RFID) module, installed in the casing of the cover body, and having a carrier, and the carrier having an antenna and a chip coupled to the antenna; and
- a electromagnetic shielding element, installed in the casing of the cover body, and disposed between the carrier and the battery.

18. The protective cover of a mobile electronic product as recited in claim 17,
- wherein the front cover includes a positioning slot formed at a bottom of the front cover for fixing the power output port.

* * * * *